United States Patent Office 3,203,963
Patented Aug. 31, 1965

3,203,963
METHOD OF PURIFYING DEHYDROMUCIC ACID
Ralph A. Hales, West Chester, Pa., and Baak W. Lew, Wilmington, Del., assignors to Atlas Chemical Industries, Inc., Wilmington, Del., a corporation of Delaware
No Drawing. Filed Apr. 18, 1963, Ser. No. 273,850
8 Claims. (Cl. 260—347.3)

The present invention relates to a process for producing a purified dehydromucic acid (2,5-furan dicarboxylic acid) product, hereinafter referred to as DHMA, and more particularly, to a method wherein a decolorized DHMA product especially suited for use in clear resin formulations is produced.

Generally, purification of crude, discolored DHMA by recrystallization from solution is not feasible because of the inherent insolubility of DHMA in water and most of the useful solvents. Fractional distillation is not a useful purification method as DHMA decomposes upon heating. Prior to the present invention crude, discolored DHMA has presented a purification problem.

In accord with the present invention, a purified DHMA product may be produced by initially forming a water solution of an alkali metal salt of DHMA. Suitably the salt product is a combination of from about 5 to about 30% by weight of the mono alkali metal salt and from about 70% to about 95% of the di alkali metal salt. The salt solution may then be treated with activated carbon to produce a decolorized DHMA alkali metal salt product. Preferably the activated carbon treatment is carried out by distributing from about 2% to about 30% by weight of particulate activated carbon based on the weight of the salt through the solution by stirring. The solution may then be filtered to recover a filtrate of a DHMA alkali salt product which has a lighter color than the DHMA starting material. In order to maintain the preferred salt proportions of mono and di salts the solution of the DHMA alkali salt solution is maintained at a pH between about 3.5 and 6.0. The pH of the DHMA alkali salt solution may suitably be adjusted to the preferred range by the addition of a mineral acid. Utilizing the foregoing proportions of mono and di alkali metal salts of DHMA, an acidic solution may be maintained and a solution having a high concentration DHMA salt may be obtained. Generally solutions of DHMA alkali metal salts having a total salt concentration as high as 25% by weight are aptly suited to carry out the process of the present invention. Solutions of a higher salt concentration tend to crystallize. It is desirable to carry out the present invention at temperatures which are not unduly high as high temperatures may cause decomposition of the DHMA or the DHMA alkali salt products. The present process, therefore, utilizes temperatures which are sufficiently high to insure solubility of the DHMA alkali salts but insufficiently high to cause decomposition of DHMA or the DHMA salts. Temperatures of up to about 80° C. may usually be employed without difficulty. Temperatures of 20° C. or higher generally maintain the salts in solution. It may be desirable to treat the DHMA alkali salt solution with an oxidizing agent to remove any residual oxidizable materials prior to the activated carbon treatment. Suitably this may be done by the addition of an oxidizing agent selected from the group consisting of potassium permanganate and hydrogen peroxide. From about 1% to about 10% of potassium permanganate, based on the weight of the alkali metal salt, in a neutral or alkaline solution has been found eminently suited to use. Usually, from about 1 to about 50% of hydrogen peroxide, based on the weight of the salt, is useful in either acidic, neutral or alkaline solutions. After addition of the oxidizing agent the solution is allowed to stand for a short period prior to addition of the activated carbon. Generally a waiting time of between about 10 and about 15 minutes has been found sufficient to yield a product substantially free of oxidizable color producing materials.

If a substantially decolorized DHMA product is desired, the DHMA alkali salt solution from the filtration step may be treated with a mineral acid in an amount at least equivalent to that required to react with the alkali metal salt. This step produces a substantially decolorized DHMA product which may be recovered from the acidified solution by filtration. A substantially color-free DHMA product, that is, one having improved color characteristics over the substantially decolorized DHMA product, from the acid treatment step may be produced by the further step of passing hot water, suitably in the range of from about 50° C. to about 100° C., through the last described decolorized DHMA product.

The present purification process minimizes the volume of DHMA alkali salt solution which is to be treated with activated carbon.

The following example is illustrative of the process of the present invention:

*Example 1*

9500 grams of an alkaline, aqueous solution of the sodium salt of DHMA containing the equivalent of 1450 grams of DHMA was utilized as a DHMA alkali metal salt starting material. The solution was dark yellow in color. The solution was neutralized by the addition of 234 grams of an aqueous hydrochloric acid solution containing 37% by weight of HCl. An additional 116 grams of the 37% hydrochloric acid were then added to adjust the pH to 4.5. 140 grams of particulate activated carbon were added and distributed throughout the solution by stirring. After the activated carbon had been stirred through the solution for one half hour at a temperature of 60° C., the partially spent carbon was removed by filtration. The filter cake was then washed with two liters of hot water. The color of the solution, slight lemon, was a much lighter color than the yellow color of the starting material.

The filtrate was cooled to 13° C. and 1780 grams of 37% hydrochloric acid were slowly added. A slurry of DHMA was formed. The DHMA slurry contained a small excess of hydrochloric acid and had a pH of 1.8. The DHMA slurry was next filtered and washed with cold water to remove soluble chlorides. The color of the DHMA product was almost white.

If a still lighter color DHMA product is desired, the DHMA filter cake product from the preceding step may again be slurried with water and leached with hot water washes. In the present example sufficient distilled water was added to give 13,000 grams of slurry. The latter-formed slurry was then heated to 90° C. while stirring and then filtered while hot. The DHMA filter cake product was then washed with 2 liters of hot water and dried under a vacuum at 60° C. The dried DHMA cake product weighed 1,355 grams and was white.

The filtrate and wash liquor contained approximately 75 grams of DHMA product as determined by the bulk of the residual DHMA product precipitated as a light yellow material when the solutions cooled. This material may suitably be recovered by filtration, treated with an alkali metal hydroxide to produce a DHMA alkali metal salt and utilized to supplement the initial feed material in a subsequent purification process.

What is claimed is:
1. A process of producing a purified dehydromucic acid product which comprises the steps of treating an aqueous solution of an alkali metal salt of dehydromucic acid, with a mineral acid
until a dehydromucic acid alkali salt product containing from about 5 to about 30% by weight of the mono alkali metal salt and from about 70% to about 95% of the di alkali metal salt is obtained,
treating said aqueous solution with particulate activated carbon, and
separating a decolorized dehydromucic acid alkali salt product.

2. A process in accord with claim 1 wherein the alkali metal in said dehydromucic acid alkali metal salt product is sodium.

3. A process of producing a purified dehydromucic acid product which comprises the steps of
treating an aqueous solution of an alkali metal salt of dehydromucic acid, with a mineral acid
until a dehydromucic acid alkali salt product containing from about 5 to about 30% by weight of the mono alkali metal salt and from about 70% to about 95% of the di alkali metal salt is obtained,
distributing from about 2% to about 30% by weight of particulate activated carbon based on the weight of the said salt product through an aqueous solution of said salt product,
filtering said solution to remove the particulate activated carbon, and
recovering a decolorized dehydromucic acid alkali salt product.

4. The process of claim 3 wherein the pH of the initially treated mixture containing dehydromucic acid is between about 3.5 about 6.0.

5. The process of claim 3 wherein the process is carried out at a temperature of between about 20° C. and about 70° C.

6. The process of claim 3 wherein the alkali metal salt solution of dehydromucic acid prior to treatment with activated carbon is treated with an oxidizing agent selected from the group consisting of potassium permanganate and hydrogen peroxide.

7. A process of producing in purified dehydromucic acid product which comprises the steps of
treating a mixture containing dehydromucic acid with an alkali metal hydroxide
until a solution containing from about 5 to about 30% by weight of the mono alkali metal salt and from about 70% to about 95% of the di alkali metal salt is obtained
adding from about 2% to about 30% by weight of particualte activated carbon based on the weight of the salts to said solution distributing said carbon through said solution,
removing said partciulate activated carbon from said solution,
treating said solution with a mineral acid in an amount equivalent to react with the alkali-metal salt, and
recovering a decolorized dehydromucic acid product.

8. The process of claim 7 wherein
water in the temperature range of from about 50° C. to 100° C. is uassed through the last recovered dehydromucic acid, and
recovering a substantially color-free dehydromucic acid.

References Cited by the Examiner

Dunlop et al., The Furans, A.C.S. Monograph No. 119 (1953), page 574.

Robertson, Laboratory Practice of Organic Chemistry, Third Edition (1954), page 158.

NICHOLAS S. RIZZO, *Primary Examiner.*

UNITED STATES PATENT OFFICE
CERTIFICATE OF CORRECTION

Patent No. 3,203,963                                                August 31, 1965

Ralph A. Hales et al.

It is hereby certified that error appears in the above numbered patent requiring correction and that the said Letters Patent should read as corrected below.

Column 4, line 24, for "uassed" read -- passed --.

Signed and sealed this 26th day of April 1966.

(SEAL)
Attest:

ERNEST W. SWIDER                                        EDWARD J. BRENNER
Attesting Officer                                           Commissioner of Patents